United States Patent
Shimazawa et al.

(10) Patent No.: US 9,177,572 B2
(45) Date of Patent: Nov. 3, 2015

(54) THERMALLY-ASSISTED MAGNETIC RECORDING METHOD

(71) Applicants: TDK CORPORATION, Tokyo (JP); SAE MAGNETICS (H.K.) LTD., Shatin, N.T., Hong Kong (CN)

(72) Inventors: Koji Shimazawa, Tokyo (JP); Pak Kin Wong, Hong Kong (CN); Vincent Man Fat Chiah, Hong Kong (CN)

(73) Assignees: TDK CORPORATION, Tokyo (JP); SAE MAGNETICS (H.K.) LTD., Hong Kong (CN)

( * ) Notice: Subject to any disclaimer, the term of this patent is extended or adjusted under 35 U.S.C. 154(b) by 29 days.

(21) Appl. No.: 14/104,336

(22) Filed: Dec. 12, 2013

(65) Prior Publication Data

US 2015/0170675 A1 Jun. 18, 2015

(51) Int. Cl.
*G11B 5/33* (2006.01)
*G11B 5/127* (2006.01)
*G11B 5/02* (2006.01)
*G11B 5/09* (2006.01)
*G11B 5/00* (2006.01)

(52) U.S. Cl.
CPC .......... *G11B 5/09* (2013.01); *G11B 2005/0021* (2013.01)

(58) Field of Classification Search
CPC .............................................. G11B 2005/0024
USPC .......... 369/13.33, 13.02–13.05, 13.12, 13.14, 369/13.15, 13.24; 360/59
See application file for complete search history.

(56) References Cited

U.S. PATENT DOCUMENTS

| | | | |
|---|---|---|---|
| 8,848,495 B1 * | 9/2014 | Wu et al. ..................... | 369/13.33 |
| 2006/0203397 A1 * | 9/2006 | Mizuno et al. ........... | 360/324.11 |
| 2006/0279978 A1 * | 12/2006 | Krusin-Elbaum et al. .... | 365/148 |
| 2008/0239542 A1 * | 10/2008 | Yuasa et al. ..................... | 360/59 |
| 2009/0274931 A1 * | 11/2009 | Qiu et al. ..................... | 428/814 |
| 2010/0002330 A1 * | 1/2010 | Lille ............................... | 360/59 |
| 2015/0043317 A1 * | 2/2015 | Seigler et al. .............. | 369/13.33 |

OTHER PUBLICATIONS

U.S. Appl. No. 13/850,480, filed Mar. 26, 2013 in the name of Satoshi Tomikawa et al.

* cited by examiner

*Primary Examiner* — Dionne Pendleton
(74) *Attorney, Agent, or Firm* — Oliff PLC (57) ABSTRACT

The thermally-assisted magnetic recording method is a method to perform information recording on a magnetic recording medium by a thermally-assisted magnetic recording head having a magnetic pole and a heating element, and the method includes: performing annealing treatment of the heating element through applying first energy to the heating element and heating the heating element; and performing information recording to a predetermined recording region of the magnetic recording medium after the annealing treatment. The information recording is performed through rotating the magnetic recording medium as well as floating the thermally-assisted magnetic recording head above the magnetic recording medium, and applying second energy to the heating element to heat a predetermined recording region of the magnetic recording medium as well as applying a write magnetic field from the magnetic pole to the predetermined recording region.

2 Claims, 6 Drawing Sheets

THERMALLY-ASSISTED MAGNETIC RECORDING METHOD

BACKGROUND OF THE INVENTION

1. Field of the Invention

The invention relates to a thermally-assisted magnetic recording method in which near-field light is applied to a magnetic recording medium to lower a coercivity thereof so as to record information.

2. Description of Related Art

In the past, a magnetic disk unit has been used for writing and reading magnetic information (hereinafter, simply referred to as information). The magnetic disk unit includes, in the housing thereof for example, a magnetic disk in which information is stored, and a magnetic read write head that records information into the magnetic disk and reproduces information stored in the magnetic disk. The magnetic disk is supported by a rotary shaft of a spindle motor, which is fixed to the housing, and rotates around the rotary shaft. On the other hand, the magnetic read write head is formed on a side surface of a magnetic head slider provided on one end of a suspension, and includes a magnetic write element and a magnetic read element that have an air bearing surface (ABS) facing the magnetic disk. In particular, as the magnetic read element, a magnetoresistive (MR) element exhibiting MR effect is generally used. The other end of the suspension is attached to an end of an arm pivotally supported by a fixed shaft installed upright in the housing.

When the magnetic disk unit is not operated, namely, when the magnetic disk does not rotate and remains stationary, the magnetic read write head is not located over the magnetic disk and is pulled off to the outside (unload state). When the magnetic disk unit is driven and the magnetic disk starts to rotate, the magnetic read write head is changed to a state where the magnetic read write head is moved to a predetermined position over the magnetic disk together with the suspension (load state). When the rotation number of the magnetic disk reaches a predetermined number, the magnetic head slider is stabilized in a state of slightly floating over the surface of the magnetic disk due to the balance of positive pressure and negative pressure, and thus, information is accurately recorded and reproduced.

In recent years, along with a progress in higher recording density (higher capacity) of the magnetic disk, improvement in performance of the magnetic read write head and the magnetic disk has been demanded. The magnetic disk is a discontinuous medium including collected magnetic microparticles, and each magnetic microparticle has a single-domain structure. In the magnetic disk, one recording bit is configured of a plurality of magnetic microparticles. Since it is necessary for the asperity of a boundary between adjacent recording bits to be small in order to increase the recording density, it is necessary for the magnetic microparticles to be made small. However, if the magnetic microparticles are made small in size, thermal stability of the magnetization of the magnetic microparticles is disadvantageously lowered with decrease in volume of the magnetic microparticles. To solve the issue, increasing anisotropy energy of the magnetic microparticle is effective. However, increasing the anisotropy energy of the magnetic microparticle leads to increase in coercivity of the magnetic disk, and as a result, difficulty occurs in the information recording in the existing magnetic head.

As a method to solve the above-described difficulty, a so-called thermally-assisted magnetic recording has been proposed. In the method, a magnetic disk with large coercivity is used, and when information is written, heat is applied together with the magnetic field to a section of the magnetic disk where the information is to be written to increase the temperature and to lower the coercivity of that section, thereby writing the information. Hereinafter, the magnetic head used in the thermally-assisted magnetic recording is referred to as a thermally-assisted magnetic recording head.

In performing the thermally-assisted magnetic recording, near-field light is generally used for applying heat to a magnetic disk. For example, in Japanese Unexamined Patent Application Publication No. 2001-255254 and in Japanese Patent No. 4032689, disclosed is a technology of allowing frequency of light to coincide with a resonant frequency of plasmons that are generated in a metal, by directly applying the light to a plasmon generator, in order to generate near-field light. In the method of directly applying light to a plasmon generator, however, the plasmon generator itself overheats and accordingly deforms, depending on usage environment or conditions. Therefore, practical realization of the method is difficult.

Therefore, as a technology capable of avoiding such overheating, in Japanese Patent No. 4104584, a thermally-assisted head using surface plasmon polariton coupling is proposed. In this technology, without direct irradiation of light propagating through a waveguide (guided light) to a plasmon generator, the guided light is coupled to the plasmon generator through evanescent coupling, and surface plasmon polaritons generated on a surface of the plasmon generator are used.

In the thermally-assisted magnetic recording head using such surface plasmon polaritons, temperature increase of the plasmon generator is suppressed to some extent. However, it was confirmed that, when such a high temperature state is continued over a long period of time, deformation (expansion and shrinkage) due to heat may occur in a section, where a volume is low and where the heat particularly concentrats, of the plasmon generator in the vicinity of the air-bearing surface.

SUMMARY OF THE INVENTION

When such deformation occurs, a tip section of the plasmon generator is receded from the air-bearing surface and backs away from the magnetic recording medium. Therefore, it causes degradation of recording performance. To avoid such a situation, it is necessary to continuously monitor a distance between the plasmon generator and the magnetic recording medium by any method, and to perform adjustment of floating height point by point. However, such adjustment is extremely troublesome, and if drastic deformation occurs, it is extremely difficult to perform adjustment following the deformation. Accordingly, it is desirable to provide a thermally-assisted magnetic recording method capable of suppressing deformation of a plasmon generator during operation and performing magnetic recording with higher density.

According to an embodiment of the present invention, there is provided a first thermally-assisted magnetic recording method to perform information recording to a magnetic recording medium by a thermally-assisted magnetic recording head having a magnetic pole and a heating element, and the method includes: performing annealing treatment of the heating element through applying first energy to the heating element and heating the heating element; and performing information recording to a predetermined recording region of the magnetic recording medium after the annealing treatment. The information recording is performed through rotating the magnetic recording medium as well as floating the thermally-assisted magnetic recording head above the magnetic recording medium, and applying second energy to the heating element to heat a predetermined recording region of the magnetic recording medium as well as applying a write magnetic field from the magnetic pole to the predetermined recording region.

In the first thermally-assisted magnetic recording method according to the embodiment of the invention, the annealing treatment is performed on the heating element, and then the heating element is used to perform the information recording to the magnetic recording medium. The heating element is expanded or shrunk by the annealing treatment in the preceding stage of the information recording operation. Therefore, the heating element does not show remarkable shrinkage at the time of the information recording operation.

In the first thermally-assisted magnetic recording method according to the embodiment of the invention, the first energy is greater than the second energy. For example, the first energy may be preferably 1.05 times or more and 1.20 times or less of the second energy. In addition, a time during which the second energy is continuously applied to the heating element may be preferably set to 10 minutes or more and 2 hours or less.

According to another embodiment of the invention, there is provided a second thermally-assisted magnetic recording method to perform information recording to a magnetic recording medium by a thermally-assisted magnetic recording head having a magnetic pole and a heating element, and the method includes: rotating the magnetic recording medium as well as floating the thermally-assisted magnetic recording head above the magnetic recording medium; and applying energy to the heating element to heat a predetermined recording region of the magnetic recording medium as well as applying a write magnetic field from the magnetic pole to the predetermined recording region. A time during which the energy is continuously applied to the heating element is set to 10 minutes or more and 2 hours or less.

In the second thermally-assisted magnetic recording method according to the embodiment of the invention, the time during which the energy is continuously applied to the heating element is set to 10 minutes or more and 2 hours or less. Therefore, the heating element is appropriately cooled without being exposed to high temperature over a long period of time. As a result, excessive temperature increase of the heating element is avoided, and plastic deformation of the heating element is prevented. Consequently, degradation of the magnetic recording performance caused by deformation of the heating element is suppressed, and thus magnetic recording with higher density becomes possible. Moreover, improvement in product lifetime is expected.

DETAILED DESCRIPTION OF THE PREFERRED EMBODIMENTS

Hereinafter, an embodiment of the invention will be described in detail with reference to drawings.

1. CONFIGURATION OF MAGNETIC DISK UNIT

First, referring to FIG. 1 and FIG. 2, a configuration of a magnetic disk unit according to an embodiment of the present invention will be described below.

Figure 1:
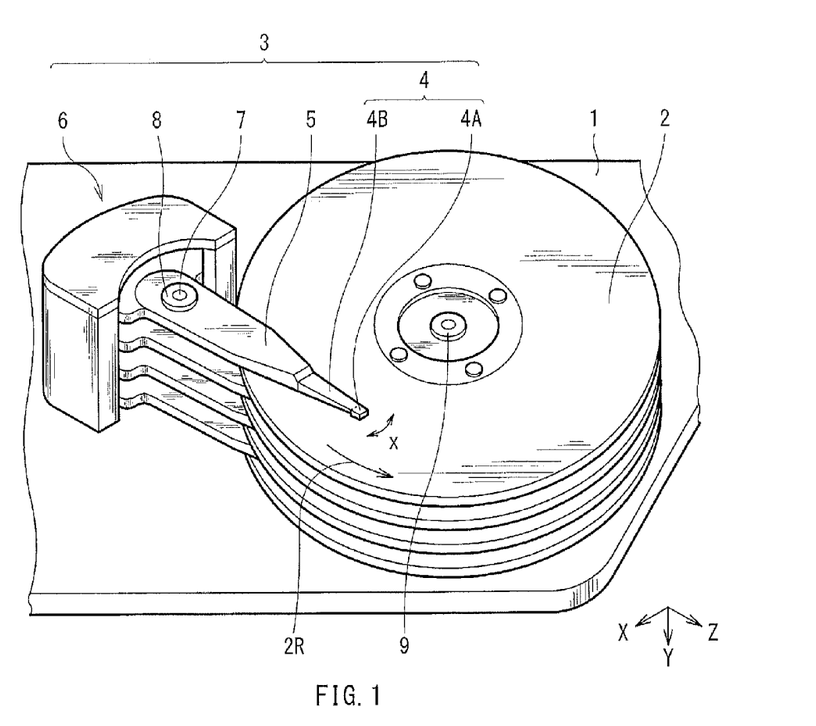
FIG. 1 is a perspective view illustrating a configuration of a magnetic disk unit provided with a magnetic read write head according to an embodiment of the invention.

FIG. 1 is a perspective view illustrating an internal configuration of the magnetic disk unit as the present embodiment. The magnetic disk unit adopts a load-unload system as a driving system, and includes, for example, in a housing 1, a magnetic disk 2 as a magnetic recording medium in which information is to be written, and a Head Arm Assembly (HAA) 3 for writing information in the magnetic disk 2 and reading the information. The HAA 3 includes a Head Gimbals Assembly (HGA) 4, an arm 5 supporting a base of the HGA 4, and a driver 6 as a power source for allowing the arm 5 to pivot. The HGA 4 includes a thermally-assisted magnetic head device (hereinafter, simply referred to as a "magnetic head device") 4A having a side surface provided with a magnetic read write head 10 (described later) according to the present embodiment, and a suspension 4B having an end provided with the magnetic head device 4A. The arm 5 supports the other end of the suspension 4B (an end opposite to the end provided with the magnetic head device 4A). The arm 5 is so configured as to be pivotable, through a bearing 8, around a fixed shaft 7 fixed to the housing 1. The driver 6 may be configured of, for example, a voice coil motor. Incidentally, the magnetic disk unit has one or a plurality of (FIG. 1 exemplifies the case of four) magnetic disks 2, and the magnetic head devices 4A are disposed corresponding to recording surfaces (a front surface and a back surface) of the respective magnetic disks 2. Each of the magnetic head devices 4A is movable in a direction across write tracks, that is, in a track width direction (in an X-axis direction) in a plane parallel to the recording surfaces of each of the magnetic disks 2. On the other hand, the magnetic disk 2 rotates around a spindle motor 9 fixed to the housing 1 in a rotation direction 2R substantially orthogonal to the X-axis direction. With the rotation of the magnetic disk 2 and the movement of the magnetic head devices 4A, information is written into the magnetic disk 2 or stored information is read out. Further, the magnetic disk unit has a control circuit (described later) that controls a write operation and a read operation of the magnetic read write head 10, and controls an emission operation of a laser diode as a light source that generates laser light used for thermally-assisted magnetic recording described later.

Figure 2:
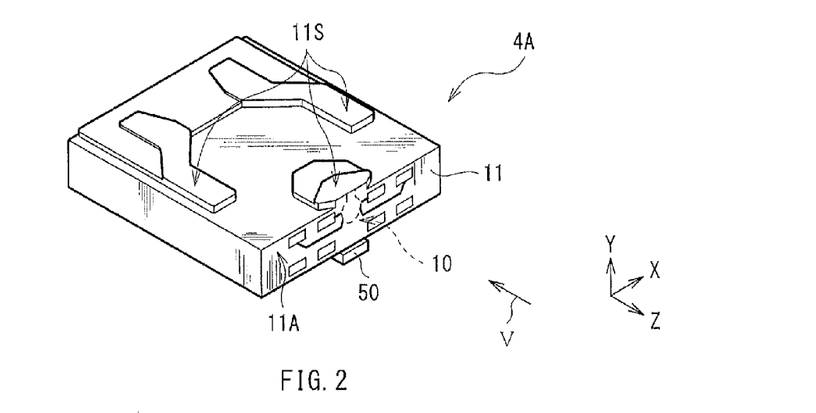
FIG. 2 is a perspective view illustrating a configuration of a slider in the magnetic disk unit illustrated in FIG. 1.

FIG. 2 illustrates a configuration of the magnetic head device 4A illustrated in FIG. 1. The magnetic head device 4A has a block-shaped slider 11 that may be formed of, for example, Al$_2$O$_3$.TiC (AlTiC). The slider 11 may be substantially formed as a hexahedron, for example, and one surface thereof corresponds to an ABS 11S that is disposed in proximity to and to face the recording surface of the magnetic disk 2. When the magnetic disk unit is not driven, namely, when the spindle motor 9 is stopped and the magnetic disk 2 does not rotate, the magnetic head device 4A is pulled off to the position away from an above part of the magnetic disk 2 (unload state), in order to prevent contact of the ABS 11S and the recording surface. In contrast, when the magnetic disk unit is initiated, the magnetic disk 2 starts to rotate at a high speed by the spindle motor 9, the arm 5 is pivotably moved around the fixed shaft 7 by the driver 6, and therefore, the magnetic head device 4A moves above the front surface of the magnetic disk 2, thereby being in a load state. The rotation of the magnetic disk 2 at a high speed causes air flow between the recording surface and the ABS 11S, and lift force caused by the air flow leads to a state where the magnetic head device 4A floats to maintain a certain distance (magnetic spacing) along a direction (a Y-axis direction) orthogonal to the recording surface. In addition, on an element forming surface 11A that is one side surface orthogonal to the ABS 11S, the magnetic read write head 10 is provided. Incidentally, on a surface 11B opposite to the ABS 11S of the slider 11, a light source unit 50 is provided near the magnetic read write head 10.

2. DETAILED STRUCTURE OF MAGNETIC READ WRITE HEAD

Next, the magnetic read write head 10 is described in more detail with reference to FIG. 3 to FIG. 6.

Figure 3:
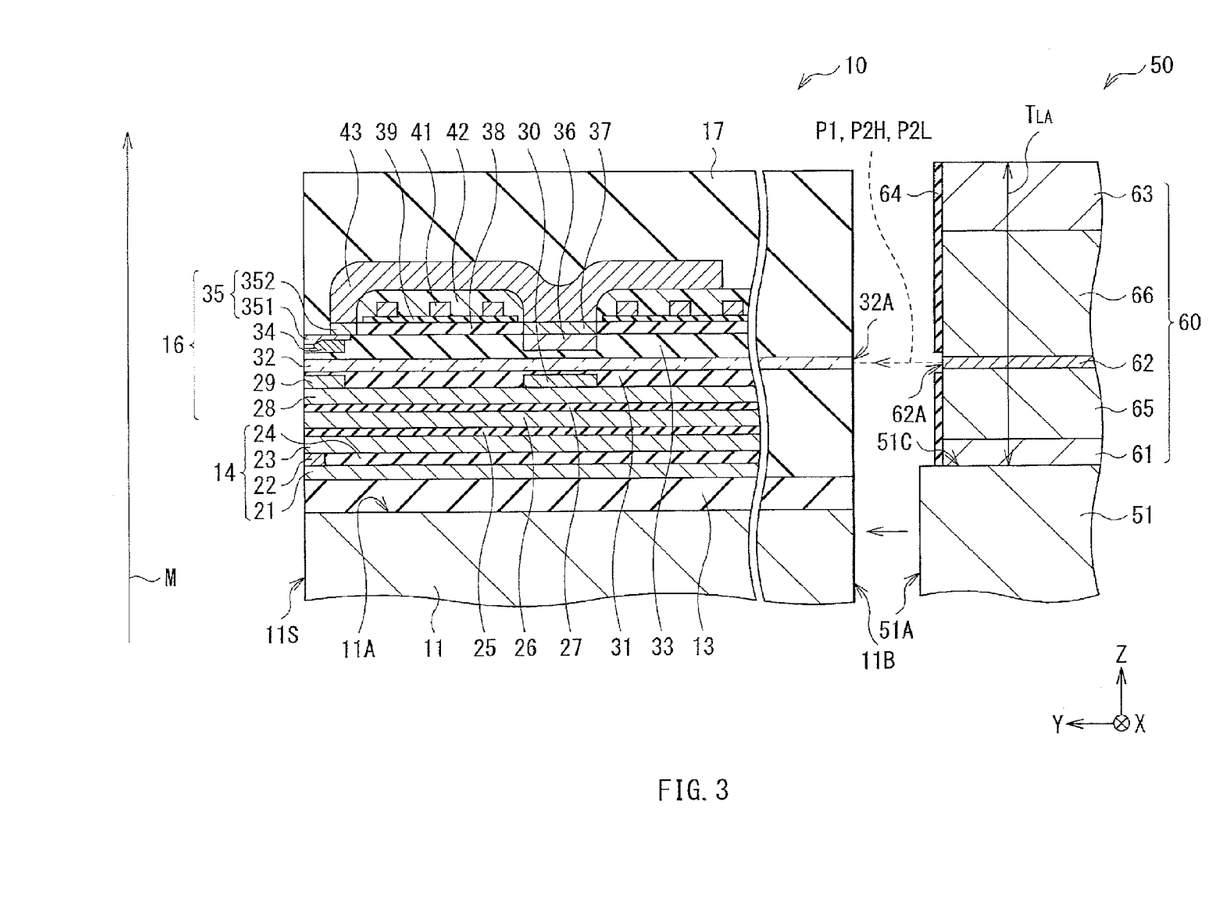
FIG. 3 is a sectional view illustrating a structure of a cross-sectional surface (YZ cross-sectional surface) orthogonal to an air bearing surface, in the magnetic read write head illustrating in FIG. 2.
Figure 4:
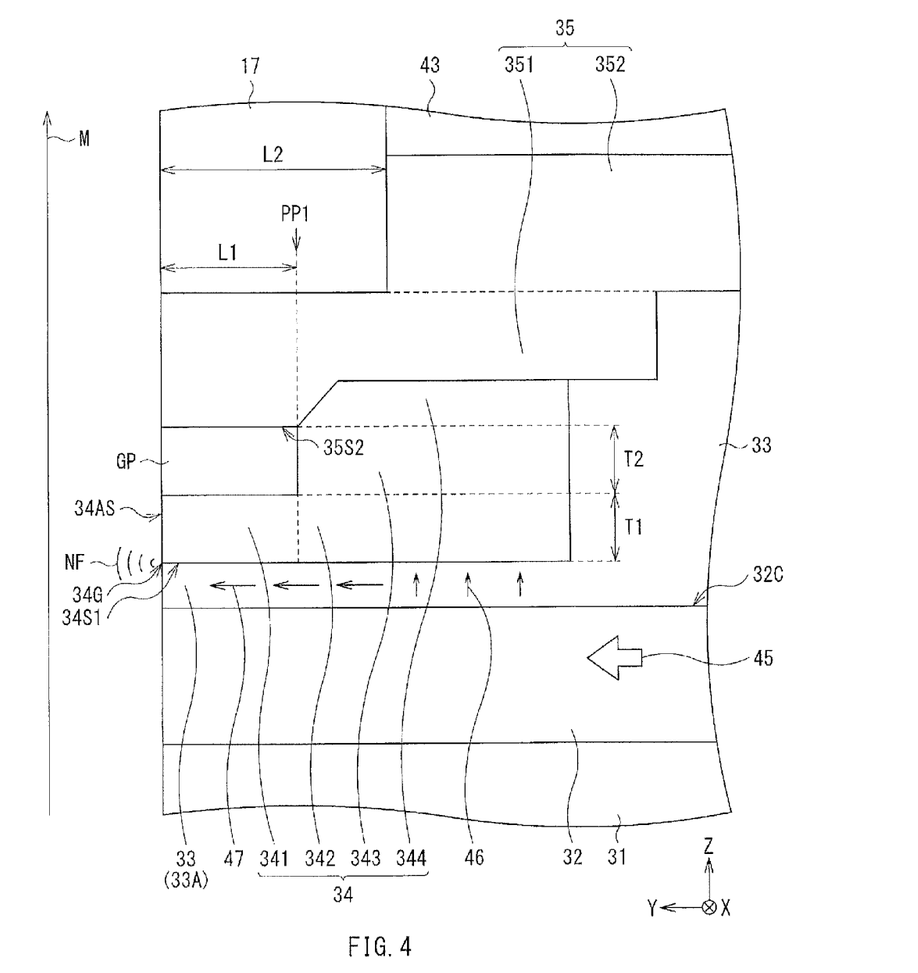
FIG. 4 is a sectional view illustrating a main part of the magnetic read write head illustrated in FIG. 3 in an enlarged manner.
Figure 5:
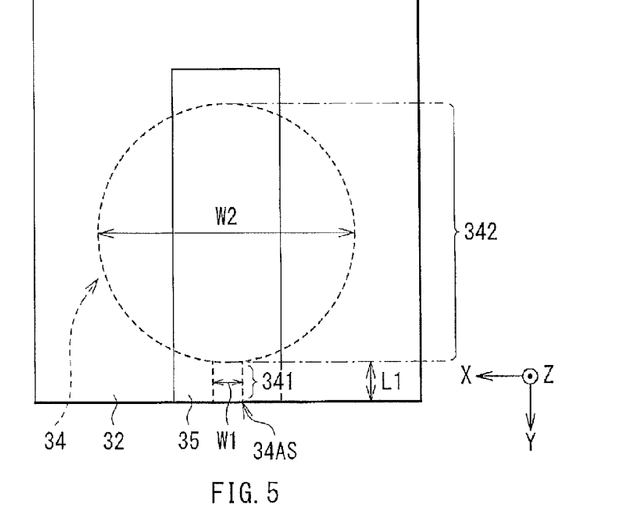
FIG. 5 is a schematic diagram illustrating a shape in an XY plane of the main part of the magnetic read write head.
Figure 6:
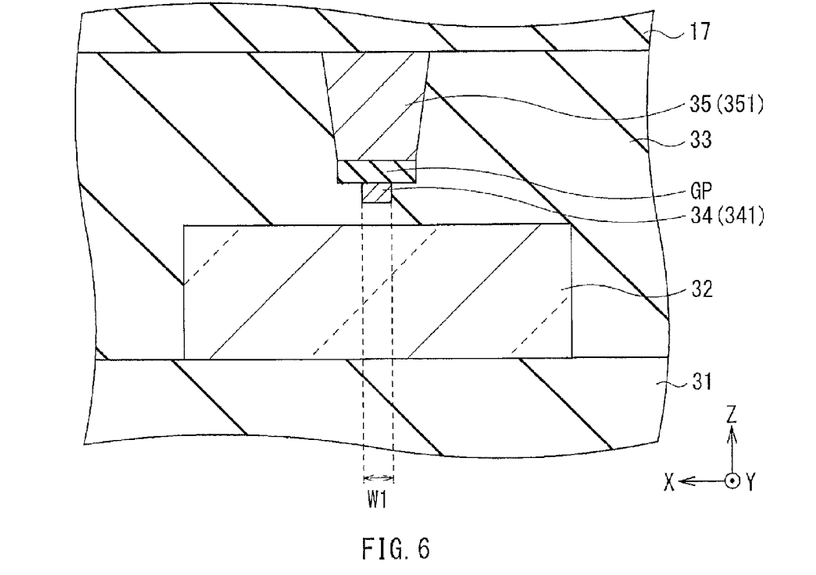
FIG. 6 is a schematic diagram illustrating a structure of an end surface exposed on the air bearing surface, in the main part of the magnetic read write head.

FIG. 3 is a sectional view of the magnetic read write head 10 illustrated in FIG. 2, in the YZ cross-sectional surface orthogonal to the ABS 11S, and FIG. 4 is an enlarged sectional view illustrating a part of FIG. 3 in an enlarged manner. FIG. 5 is a schematic diagram illustrating a planar structure of a main part of the magnetic read write head 10 viewed from an arrow V direction illustrated in FIG. 2. FIG. 6 illustrates a part of an end surface exposed on the ABS 11S in an enlarged manner.

Note that an up-arrow M illustrated in FIG. 3 and FIG. 4 indicates a direction in which the magnetic disk 2 moves relative to the magnetic read write head 10.

In the following description, dimensions in the X-axis direction, the Y-axis direction, and the Z-axis direction are referred to as "width", "height" or "length", and "thickness", respectively, and a closer side and a farther side to/from the ABS 11S in the Y-axis direction are referred to as "forward" and "backward", respectively. Moreover, forward and backward in the direction of the arrow M are referred to as "trailing side" and "leading side", respectively, and the X-axis direction and the Z-axis direction are referred to as "cross track direction" and "down track direction", respectively.

The magnetic read write head 10 has a stacked structure including an insulating layer 13, a read head section 14, a write head section 16, and a protective layer 17 that are stacked in order on the slider 11. Each of the read head section 14 and the write head section 16 has an end surface exposed on the ABS 11S.

The read head section 14 uses magneto-resistive effect (MR) to perform a read process. The read head section 14 may be configured by stacking, for example, a lower shield layer 21, an MR element 22, and an upper shield layer 23 in this order on the insulating layer 13.

The lower shield layer 21 and the upper shield layer 23 may be respectively formed of, for example, a soft magnetic metal material such as NiFe (nickel iron alloy), and are disposed to face each other with the MR element 22 in between in the stacking direction (in the Z-axis direction). As a result, these layers each exhibit a function to protect the MR element 22 from the influence of an unnecessary magnetic field.

One end surface of the MR element 22 is exposed on the ABS 11S, and the other end surfaces thereof are in contact with an insulating layer 24 filling a space between the lower shield layer 21 and the upper shield layer 23. The insulating layer 24 is formed of an insulating material such as Al$_2$O$_3$ (aluminum oxide), AlN (aluminum nitride), SiO$_2$ (silicon dioxide), and DLC (diamond-like carbon).

The MR element 22 functions as a sensor to read magnetic information written in the magnetic disk 2. The MR element 22 is, for example, a CPP (Current Perpendicular to Plane)—GMR (Giant Magnetoresistive) element or a tunnel magnetoresistive effect element (TMR element), sense current of each of which flows inside thereof in a stacking direction. In this case, the lower shield layer 21 and the upper shield layer 23 each function as an electrode to supply the sense current to the MR element 22. Alternatively, the MR element 22 may be a CIP (Current In Plane) type magnetoresistive effect element whose sense current flows inside thereof in an in-plane direction.

In the read head section 14 with such a structure, a magnetization direction of a free layer (not illustrated) included in the MR element 22 changes in response to a signal magnetic field from the magnetic disk 2. Thus, the magnetization direction of the free layer shows a change relative to a magnetization direction of a pinned layer (not illustrated) also included in the MR element 22. When the sense current flows through the MR element 22, the relative change of the magnetization direction appears as the change of the electric resistance, and thus, the signal magnetic field is detected with use of the change and the magnetic information is accordingly read out.

On the read head section 14, a non-magnetic layer 25, an intermediate shield layer 26, and an insulating layer 27 are stacked in order. The intermediate shield layer 26 functions to prevent a magnetic field that is generated in the write head section 16, from reaching the MR element 22, and may be formed of, for example, a soft magnetic metal material such as NiFe. The non-magnetic layer 25 may be formed of a non-magnetic insulating material such as Al$_2$O$_3$ (alumina) or a non-magnetic metal material such as Ru (ruthenium). The insulating layer 27 may be formed of the similar material to that of the insulating layer 24, for example.

The write head section 16 is a perpendicular magnetic write head performing a writing process of thermally-assisted magnetic recording system. The write head section 16 has, for example, a lower yoke layer 28, a leading shield 29 and a connecting layer 30, a cladding layer 31, a waveguide 32, and a cladding layer 33 in order on the insulating layer 27. Note that the leading shield 29 may be omitted from the structure.

The lower yoke layer 28, the leading shield 29, and the connecting layer 30 are each formed of a soft magnetic metal material such as NiFe. The leading shield 29 is located at the frontmost end of the upper surface of the lower yoke layer 28 in such a manner that one end surface thereof is exposed on the ABS 11S. The connecting layer 30 is located at the backward of the leading shield 29 on the upper surface of the lower yoke layer 28.

The cladding layer 31 is provided so as to cover the lower yoke layer 28, the leading shield 29, and the connecting layer 30.

The waveguide 32 provided on the cladding layer 31 extends in a direction (the Y-axis direction) orthogonal to the ABS 11S, one end surface thereof is exposed on the ABS 11S, and the other end surface thereof is exposed at the backward thereof, for example. Note that the front end surface of the waveguide 32 may be located at a position receded from the ABS 11S without being exposed on the ABS 11S. The waveguide 32 is formed of a dielectric material allowing laser light to pass therethrough. Specifically, the waveguide 32 may be formed of a material essentially containing one or more of, for example, SiC, DLC, TiOx (titanium oxide), TaOx (tantalum oxide), SiNx (silicon nitride), $SiO_xN_y$ (silicon oxynitride), Si (silicon), zinc selenide (ZnSe), NbOx (niobium oxide), GaP (gallium phosphide), ZnS (zinc sulfide), ZnTe (zinc telluride), CrOx (chromium oxide), FeOx (iron oxide), CuOx (copper oxide), SrTiOx (strontium titanate), BaTiOx (barium titanate), Ge (germanium), and C (diamond). Essentially containing means that the above-described materials are contained as main components, and other materials may be contained as subcomponents (for example, impurity) as long as having a refractive index higher than those of the cladding layers 31 and 33. The waveguide 32 allows laser light from a laser diode 60 (described later) to propagate toward the ABS 11S. Incidentally, although the cross-sectional shape parallel to the ABS 11S of the waveguide 32 is a rectangular as illustrated in FIG. 6, for example, it may have other shapes.

The cladding layers 31 and 33 are each formed of a dielectric material having a refractive index, with respect to laser light propagating through the waveguide 32, lower than that of the waveguide 32. The cladding layers 31 and 33 may be formed of a material essentially containing one or more of, for example, SiOx (silicon oxide), $Al_2O_3$ (aluminum oxide), AlN (aluminum nitride), BeO (berylium oxide), SiC (silicon carbide), and DLC (diamond-like carbon). Essentially containing means that the above-described materials are contained as main components, and the other materials may be contained as subcomponents (for example, impurity) as long as having a refractive index lower than that of the waveguide 32.

The write head section 16 further includes a plasmon generator 34 provided above the front end of the waveguide 32 with the cladding layer 33 in between, and a magnetic pole 35 provided above the plasmon generator 34.

The plasmon generator 34 includes a first region 341 and a second region 342 located backward thereof. The first region 341 includes an end surface 34AS exposed on the ABS 11S. The second region 342 is coupled with the other end of the first region 341 opposite to the ABS 11S at a position PP1 and has a volume greater than that of the first region 341, for example.

The first region 341 extends backward from the ABS 11S to the position PP1 over a length L1 while maintaining a constant area of a cross-sectional surface (see FIG. 6) parallel to the ABS 11S. The position PP1 is a position of a boundary between the first region 341 and the second region 342. The length L1 of the first region 341 is preferably 40 nm or more and 100 nm or less, for example. In addition, a thickness T1 of the first region 341 is, for example, 10 nm or more and 80 nm or less.

As illustrated in FIG. 5, the second region 342 has, for example, a circular plane shape, and has, for example, a width W2 larger than a width W1 of the first region 341. The thickness of the second region 342 is equal to the thickness of the first region 341, for example. The second region 342 is coupled with the first region 341 at the position PP1 and extends backward.

The material of the plasmon generator 34 is a conductive material containing one or more of, for example, Pd (palladium), Pt (platinum), Rh (rhodium), Ir (iridium), Ru (ruthenium), Au (gold), Ag (silver), Cu (copper), and aluminum (Al). Among them, Au, Ag and Cu are more preferable, and Au is most preferable. This is because it is excellent in chemical stability, and more efficiently generates near-field light NF (described later). Note that the material of the first region 341 is desirably the same as that of the second region 342. This is to efficiently generate the near-field light NF. In addition, this is to avoid complication in manufacturing. However, the material of the first region 341 may be different from the material of the second region 342.

The first region 341 of the plasmon generator 34 is distanced from a first layer 351 (described later) of the magnetic pole 35, and a gap layer GP formed of a dielectric material is provided therebetween. One end of the gap layer GP is exposed on the ABS 11S similarly to the first region 341, and for example, extends backward from the ABS 11S to the position PP1 over the length L1. With such a gap layer GP provided, the first region 341 is surrounded by the cladding layer 33, and is thus distanced from the front end of the waveguide 32 and the front end of the first layer 351 of the magnetic pole 35. The thickness T2 of the gap layer GP is, for example, 10 nm or more and 50 nm or less.

A space at the rear of the gap layer GP is occupied by a third region 343 that configures a part of the plasmon generator 34. The third region 343 is provided so as to cover at least a part of the second region 342, and a front end surface of the third region 343 is in contact with a backward end surface of the gap layer GP at the position PP1. A fourth region 344 is further provided on the third region 343. In this way, the second to fourth regions 342 to 344 that have a volume sufficiently greater than that of the first region 341 having one end exposed on the ABS 11S function as a heatsink dissipating heat generated by the plasmon generator 34 during operation.

For example, the gap layer GP is essentially formed of one or more dielectric materials selected from $SiO_2$, $Al_2O_3$, MgO, ZnO, TaSiO, $MgF_2$, SiON, AlON, and ITO.

The magnetic pole 35 has a structure in which, for example, the first layer 351 and a second layer 352 are stacked in order on the plasmon generator 34. The first layer 351 has an end surface 35S1 exposed on the ABS 11S, and a counter surface 35S2 that faces the first region 341 of the plasmon generator 34 with the gap layer GP in between. The counter surface 35S2 is in contact with, for example, the entire upper surface of the gap layer GP.

The second layer 352 extends backward from a position receded from the ABS 11S by a length L2 (>L1). Both of the first layer 351 and the second layer 352 are formed of, for example, a magnetic material with high saturation flux density such as iron-based alloy. Examples of the iron-based alloy include FeCo (iron cobalt alloy), FeNi (iron nickel alloy), and FeCoNi (iron cobalt nickel alloy). Incidentally, although a cross-sectional shape of the first layer 351 parallel to the ABS 11S is, for example, an inverted trapezoid as illustrated in FIG. 6, may be other shapes.

The plasmon generator 34 generates near-field light NF from the ABS 11S, based on the laser light that has propagated through the waveguide 32. The magnetic pole 35 stores therein magnetic flux generated in a coil 41 (described later), releases the magnetic flux from the ABS 11S, thereby generating a write magnetic field for writing magnetic information into the magnetic disk 2. The plasmon generator 34 and the first layer 351 are embedded in the cladding layer 33.

As illustrated in FIG. 3, the write head section 16 further includes a connecting layer 36 embedded in the cladding layer 33 at the backward of the plasmon generator 34 and the magnetic pole 35, and a connecting layer 37 that is so provided as to be in contact with an upper surface of the connecting layer 36. The connecting layers 36 and 37 are located above the connecting layer 30 and are formed of a soft magnetic metal material such as NiFe. Note that the connecting layer 36 is magnetically connected by a connection section (not illustrated) that may be formed of, for example, a soft magnetic metal material such as NiFe.

As illustrated in FIG. 3, on the cladding layer 33, an insulating layer 38 is provided to fill surroundings of the second layer 352 of the magnetic pole 35. An insulating layer 39 and the coil 41 that is formed in spiral around the connecting layer 37 are stacked in order on the insulating layer 38. The coil 41 is intended to generate recording-use magnetic flux by a write current flowing therethrough, and is formed of a high conductive material such as Cu (copper) and Au (gold). The insulating layers 38 and 39 are each formed of an insulating material such as $Al_2O_3$, AlN, $SiO_2$ and DLC. The insulating layer 38, the insulating layer 39, and the coil 41 are covered with an insulating layer 42, and further, an upper yoke layer 43 is so provided as to cover the insulating layer 42. The insulating layer 42 may be formed of, for example, a non-magnetic insulating material flowing during being heated, such as a photoresist or a spin on glass (SOG). The insulating layers 38, 39, and 42 each electrically separate the coil 41 from its surroundings. The upper yoke layer 43 may be formed of a soft magnetic material with high saturation flux density such as CoFe, the front section thereof is connected to the second layer 352 of the magnetic pole 35, and a part of the backward section is connected to the connecting layer 37. In addition, the front end surface of the upper yoke layer 43 is located at a position recessed from the ABS 11S.

In the write head section 16 having the foregoing structure, by the write current flowing through the coil 41, magnetic flux is generated inside a magnetic path that is mainly configured by the leading shield 29, the lower yoke layer 28, the connecting layers 30, 36, and 37, the upper yoke layer 43, and the magnetic pole 35. Accordingly, a signal magnetic field is generated near the end surface of the magnetic pole 35 exposed on the ABS 11S, and the signal magnetic field reaches a predetermined region of the recording surface of the magnetic disk 2.

Further, in the magnetic read write head 10, for example, the protective layer 17 that may be formed of a material similar to that of the cladding layer 33 is so formed as to cover the entire upper surface of the write head section 16. In other words, the cladding layer 33 and the protective layer 17 that are each formed of a material having a lower refractive index and higher thermal conductivity compared with the waveguide 32 are so provided as to collectively surround the waveguide 32, the plasmon generator 34, and the magnetic pole 35.

3. OUTLINE OF METHOD OF MANUFACTURING MAGNETIC READ WRITE HEAD

Figure 7:
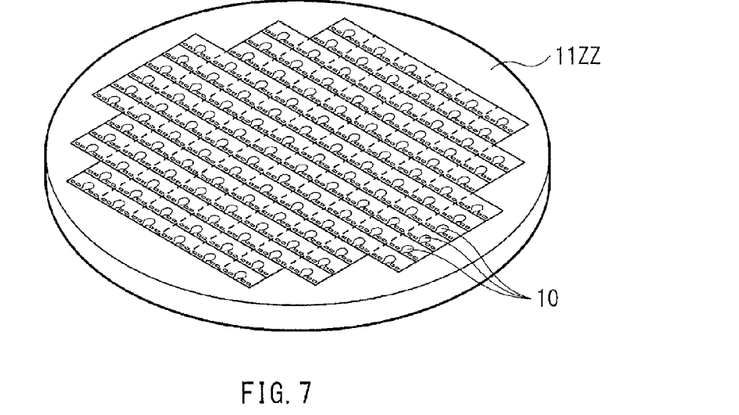
FIG. 7 is a perspective view illustrating one process in a method of manufacturing the magnetic read write head illustrated in FIG. 1.
Figure 8:
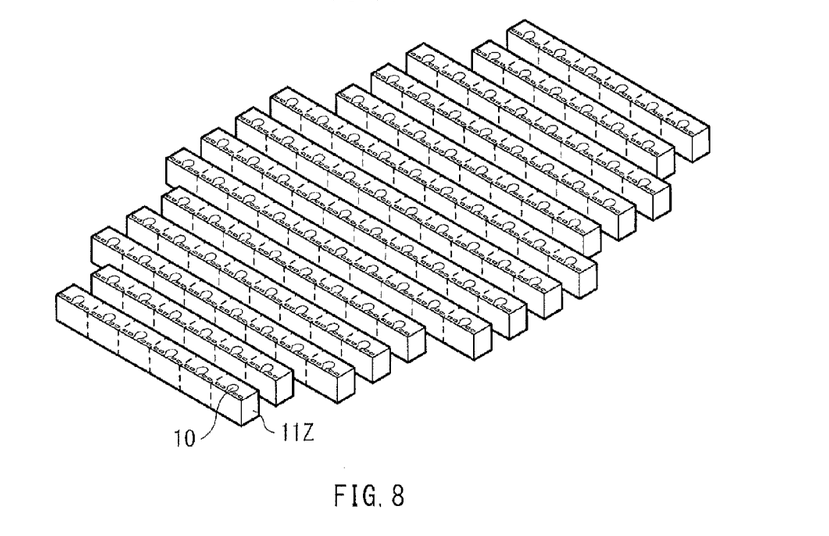
FIG. 8 is a perspective view illustrating one process following the process of FIG. 7.

Next, with reference to FIG. 7 and FIG. 8 in addition to FIG. 4, outline of a method of manufacturing the magnetic read write head 10 will be described. FIG. 7 and FIG. 8 are perspective views each illustrating one process of the method of manufacturing the magnetic read write head 10.

First, as illustrated in FIG. 7, a wafer 11ZZ that may be formed of, for example, AlTiC is prepared. The wafer 11ZZ is to be a plurality of sliders 11 finally. After that, a plurality of magnetic read write head 10 are formed in array on the wafer 11ZZ in the following way.

The magnetic read write head 10 is manufactured mainly by sequentially forming and stacking a series of components by using an existing thin film process. Examples of the existing thin film process include film forming technique such as electrolytic plating and sputtering, patterning technique such as photolithography, etching technique such as dry etching and wet etching, and polishing technique such as chemical mechanical polishing (CMP).

In this case, first, the insulating layer 13 is formed on the wafer 11ZZ. Next, the lower shield layer 21, the MR element 22 and the insulating layer 24, and the upper shield layer 23 are formed by stacking in this order on the insulating layer 13 to form the read head section 14. Subsequently, the non-magnetic layer 25, the intermediate shield layer 26, and the insulating layer 27 are stacked in order on the read head section 14.

After that, the lower yoke layer 28, the leading shield 29 and the connecting layer 30, the cladding layer 31, the waveguide 32, the cladding layer 33, the plasmon generator 34, the gap layer GP, the magnetic pole 35, and the connecting layers 36 and 37 are formed in order on the insulating layer 27. Note that the structure from which the leading shield 29 may be omitted may be employed. Further, by performing a planarization process after the insulating layer 38 is formed so as to cover the entire surface, the upper surfaces of the magnetic pole 35, the insulating layer 38, and the connecting layer 37 are planarized, and the coil 41 embedded by the insulating layers 39 and 42 is then formed. Moreover, the upper yoke layer 43 connected with the magnetic pole 35 and the connecting layer 37 is formed to complete the write head section 16. After that, the protective layer 17 is formed on the write head section 16, and as a result, the plurality of magnetic read write heads 10 in a phase before formation of the ABS 11S are formed in an array on the wafer 11ZZ (FIG. 7).

After that, as illustrated in FIG. 8, the wafer 11ZZ is cut to form a plurality of bars 11Z. The plurality of magnetic read write heads 10 are formed in line in each of the bars 11Z. Further, one side surface of the bar 11Z, that is, a side surface of the stacked structure from the slider 11 to the protective layer 17 is collectively polished the like to form the ABS 11S. At that time, it is formed so that the length L1 of the first region 341 of the plasmon generator 34 has a predetermined length. In addition, before formation of the ABS 11S, desirably, the laser light is allowed to enter the waveguide 32, and the near-field light NF is generated from a tip section 34G of the first region 341 to heat the first region 341, and agglomeration is generated in advance.

After the ABS 11S is formed, a protective film formed of a non-conductive material such as DLC may be formed so as to cover the entire ABS 11S.

4. DETAILED CONFIGURATION OF LIGHT SOURCE UNIT

The light source unit 50 is described in more detail with reference to FIG. 3 again. As illustrated in FIG. 3, the light source unit 50 provided at the rear of the magnetic read write head 10 includes the laser diode 60 as a light source emitting laser light, and, for example, a rectangular parallelepiped supporting member 51 supporting the laser diode 60.

The supporting member 51 is formed of, for example, a ceramic material such as $Al_2O_3 \cdot TiC$. As illustrated in FIG. 3, the supporting member 51 includes a bonded surface 51A to be bonded to a back surface 11B of the slider 11, and a light source mounting surface 51C orthogonal to the bonded surface 51A. The light source mounting surface 51C is parallel to the element forming surface 11A. The laser diode 60 is mounted on the light source mounting surface 51C. The supporting member 51 desirably has a function of a heatsink dissipating heat generated by the laser diode 60, in addition to the function to support the laser diode 60.

Laser diodes generally used for communication, for optical disc storage, or for material analysis, for example, InP-based, GaAs-based, or GaN-based one may be used as the laser diode 60. The wavelength of the laser light emitted from the laser diode 60 may be any value within the range of, for example, 375 nm to 1.7 μm. Specifically, it may be a laser diode of InGaAsP/InP quaternary mixed crystal with the emission wavelength region of 1.2 to 1.67 μm. As illustrated in FIG. 3, the laser diode 60 has a multilayer structure including a lower electrode 61, an active layer 62, and an upper electrode 63. For example, an n-type semiconductor layer 65 including n-type AlGaN is interposed between the lower electrode 61 and the active layer 62, and for example, a p-type semiconductor layer 66 including p-type AlGaN is interposed between the active layer 62 and the upper electrode 63. On each of two cleavage surfaces of the multilayer structure, a reflective layer 64 formed of $SiO_2$, $Al_2O_3$, or the like is provided to totally reflect light and excite oscillation. In the reflective layer 64, an opening for emitting laser light is provided at a position including an emission center 62A of the active layer 62. The relative positions of the light source unit 50 and the magnetic read write head 10 are fixed by bonding the bonded surface 51A of the supporting member 51 to the back surface 11B of the slider 11 in such a manner that the emission center 62A and the backward end surface 32A of the waveguide 32 are coincident with each other. The thickness $T_{LA}$ of the laser diode 60 is, for example, about 60 to 200 μm. When a predetermined voltage is applied between the lower electrode 61 and the upper electrode 63, laser light is emitted from the emission center 62A of the active layer 62, and then enters the backward end surface 32A of the waveguide 32. Incidentally, the laser light emitted from the laser diode 60 is preferably polarized light of a TM mode whose electric field oscillates in a direction perpendicular to the surface of the active layer 62. The laser diode 60 may be driven with use of a power source in the magnetic disk unit. The magnetic disk unit generally includes a power source generating a voltage of about 5 V, for example, and the voltage generated by the power source is sufficient to drive the laser diode 60. In addition, the laser diode 60 consumes power of, for example, about several tens mW, which is sufficiently covered by the power source in the magnetic disk unit.

5. CONTROL CIRCUIT OF MAGNETIC DISK UNIT

Figure 9:
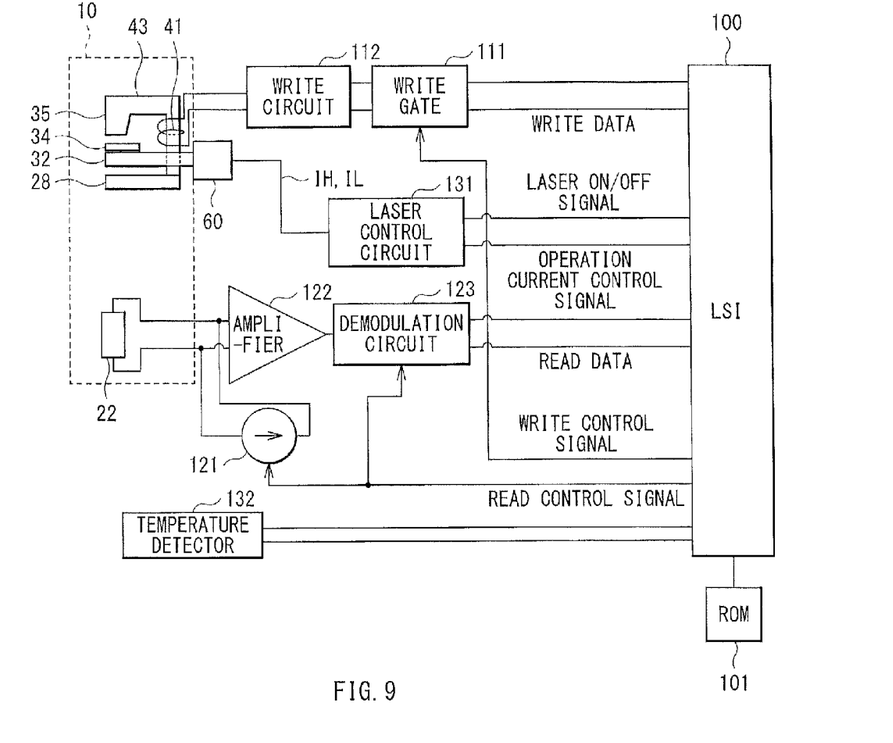
FIG. 9 is a block diagram illustrating a circuit configuration of the magnetic disk unit illustrated in FIG. 1.

Next, with reference to FIG. 9, the circuit configuration of the control circuit of the magnetic disk unit illustrated in FIG. 1 and the operation of the magnetic read write head 10 is described. The control circuit includes a control LSI (large-scale integration) 100, a ROM (read only memory) 101, a write gate 111, a write circuit 112, a constant current circuit 121, an amplifier 122, a demodulation circuit 123, a laser control circuit 131, and a temperature detector 132. The ROM 101 and the write gate 111 are each connected to the control LSI 100. The write circuit 112 connects the write gate 111 to the coil 41. The constant current circuit 121 is connected to the MR element 22 and the control LSI 100. An input end of the amplifier 122 is connected to the MR element 22, and an output end is connected to the demodulation circuit 123. The demodulation circuit 123 is connected to the amplifier 122 and the control LSI 100. The laser control circuit 131 is connected to the laser diode 60 and the control LSI 100, and the temperature detector 132 is connected to the control LSI 100.

The control LSI 100 provides write data and a write control signal to the write gate 111. Moreover, the control LSI 100 provides a read control signal to the constant current circuit 121 and the demodulation circuit 123, and receives read data output from the demodulation circuit 123. In addition, the control LSI 100 provides a laser ON/OFF signal and an operation current control signal to the laser control circuit 131.

The temperature detector 132 detects the temperature of the magnetic recording layer of the magnetic disk 2 to transmit information of the temperature to the control LSI 100. The ROM 101 holds a control table and the like to control an operation current value to be supplied to the laser diode 60. At the time of write operation, the control LSI 100 supplies the write data to the write gate 111. The write gate 111 supplies the write data to the write circuit 112 only when the write control signal instructs to perform the write operation. The write circuit 112 allows the write current to flow through the coil 41 according to the write data. As a result, the write magnetic field is generated from the magnetic pole 35, and data is written into the magnetic recording layer of the magnetic disk 2 by the write magnetic field.

At the time of read operation, the constant current circuit 121 supplies a constant sense current to the MR element 22 only when the read control signal instructs to perform the read operation. The output voltage of the MR element 22 is amplified by the amplifier 122, and is then received by the demodulation circuit 123. The demodulation circuit 123 demodulates the output of the amplifier 122 to generate read data to be provided to the control LSI 100 when the read control signal instructs to perform the read operation.

The laser control circuit 131 controls the supply of the operation current to the laser diode 60 based on the laser ON/OFF signal, and controls the value of the operation current supplied to the laser diode 60 based on the operation current control signal. When the laser ON/OF signal instructs to perform the ON operation, an operation current IH equal to or larger than an oscillation threshold is supplied to the laser diode 60 by the control of the laser control circuit 131. As a result, the laser light is emitted from the laser diode 60, and the laser light propagates through the waveguide 32. At this time, the operation current IH may preferably have magnitude sufficient for stably and accurately performing the write operation described below. Subsequently, the near-field light NF (described later) is generated from the tip section 34G of the plasmon generator 34, a part of the magnetic recording layer of the magnetic disk 2 is heated at predetermined temperature (first temperature) by the near-field light NF, and thus the coercivity in that part is lowered. At the time of writing, the write magnetic field generated from the magnetic pole 35 is applied to the part of the magnetic recording layer with lowered coercivity, and therefore data recording is performed. Note that, when the laser ON/OFF signal instructs to perform the OFF operation, an operation current IL that has a value smaller than that of the operation current IH, for example, is lower than the oscillation threshold (including 0) is supplied to the laser diode 60 by the control of the laser control circuit 131.

The control LSI 100 determines a value of the operation current of the laser diode 60 with reference to the control table stored in the ROM 101, based on the temperature and the like of the magnetic recording layer of the magnetic disk 2 measured by the temperature detector 132, and controls the laser control circuit 131 with use of the operation current control signal in such a manner that the operation current of the value is supplied to the laser diode 60. The control table includes, for example, the oscillation threshold of the laser diode 60 and data indicating temperature dependency of light output-operation current property. The control table may further include data indicating a relationship between the operation current value and the increased amount of the temperature of the magnetic recording layer heated by the near-field light NF, and data indicating temperature dependency of the coercivity of the magnetic recording layer.

The control circuit illustrated in FIG. 9 has a signal system to control the laser diode 60, namely, a signal system of the laser ON/OFF signal and the operation current control signal, independent of the control signal system of write-read operation, and therefore, more various conduction modes to the laser diode 60 are achievable, in addition to the conduction to the laser diode 60 simply operated in conjunction with the write operation.

6. RECORDING METHOD BY MAGNETIC DISK UNIT

Annealing Treatment

Before performing the thermally-assisted magnetic recording on the magnetic disk 2, the magnetic disk unit performs annealing treatment on the plasmon generator 34 in the following manner. Specifically, the laser diode 60 oscillates laser, and power P1 is applied to the plasmon generator 34 to heat the plasmon generator 34 (see FIG. 3). The power P1 is larger than power P2H that corresponds to the operation current IH of the laser diode 60. The power P1 is preferably, for example, 1.05 times or more and 1.20 times or less of the power P2H. By the annealing treatment, the first region 341 of the plasmon generator 34 expands once and then shrinks. By such an annealing treatment, the shrinking behavior of the first region 341 is moderated at the time of subsequent write operation.

(Method of Thermally-Assisted Magnetic Recording)

After the above-described annealing treatment, cooling is performed once, and then information is written to a predetermined recording region of the magnetic disk 2 in the following manner. A principle of near-field light generation and an example of a method of thermally-assisted magnetic recording using the near-field light according to the present embodiment are described with reference to FIG. 4.

First, the spindle motor 9 is driven to rotate the magnetic disk 2. After that, the driver 6 allows the arm 5 to pivot, and thus allows the slider 11 provided with the magnetic read write head 10 to float above a predetermined recording track of the magnetic disk 2. Next, the near-field light NF is generated from the plasmon generator 34 to heat the predetermined recording region of the magnetic disk 2, and the write magnetic field is applied from the magnetic pole 35 to the recording region to perform information recording.

The laser diode 60 receives supply of the operation current that is equal to or larger than the oscillation threshold, to oscillate laser light 45. The laser light 45 that has been emitted from the laser diode 60 propagates through the waveguide 32 to reach near the plasmon generator 34. At this time, the laser light 45 is totally reflected by an evanescent light generating surface 32C that is an interface between the waveguide 32 and a buffer section 33A (a section between the waveguide 32 and the plasmon generator 34, of the cladding layer 33), and therefore evanescent light 46 leaking into the buffer section 33A is generated. After that, the evanescent light 46 couples with charge fluctuation on a surface plasmon exciting surface 34S1 facing the waveguide 32, of the plasmon generator 34 to induce a surface plasmon polariton mode, and as a result, surface plasmons 47 are excited on the surface plasmon exciting surface 34S1. The surface plasmons 47 propagate on the surface plasmon exciting surface 34S1 toward the ABS 11S.

The surface plasmons 47 eventually reach the ABS 11S, and as a result, the near-field light NF is generated on the tip section 34G. The near-field light NF is irradiated toward the magnetic disk 2 (not illustrated in FIG. 4) and reaches the surface of the magnetic disk 2 to heat a part of the magnetic recording layer of the magnetic disk 2. As a result, the coercivity at the heated part of the magnetic recording layer is lowered. In the thermally-assisted magnetic recording, with respect to the part of the magnetic recording layer with the coercivity thus lowered, data writing is performed by application of the write magnetic field generated by the magnetic pole 35.

Figure 10:
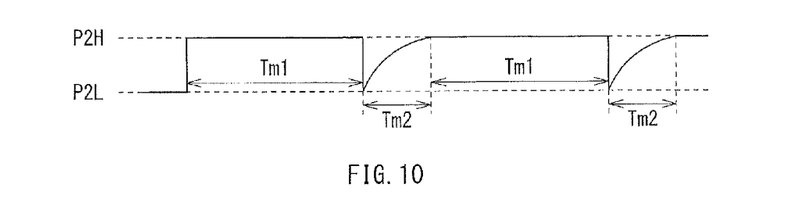
FIG. 10 is a timing diagram illustrating a heating signal in a thermally-assisted magnetic recording method using the magnetic disk unit illustrated in FIG. 1.

In such write operation, switching between the supply of the operation current IH and the supply of the operation current IL to the laser diode 60 is performed, for example, according to a timing diagram of FIG. 10. As a result, the supply of the near-field light NF as energy to heat the magnetic disk 2 and interruption of the supply of the near-field light NF (for example, 1 second or less) are performed subsequently. In FIG. 10, P2H indicates the power corresponding to the operation current IH to the laser diode 60, and P2L indicates the power corresponding to the operation current IL to the laser diode 60. Incidentally, the power P2L may be zero. However, to improve operation stability of the laser diode 60, the power P2L is desirably larger than zero, and is desirably as small as possible. Therefore, for example, $0<P2L\leq 0.75\times P2H$ is desirably satisfied. In this case, by the above-described control circuit, a continuous supply time Tm1 of the operation current IH to the laser diode 60 equal to or larger than the oscillation threshold is set to, for example, 10 minutes or more and 2 hours or less.

Moreover, an interruption time Tm2 necessary for reheating to the power P2H again after the power is switched from the power P2H to the power P2L is about 4 seconds, for example. In this way, switching the power from the power P2H to the power P2L once interrupts the write operation. At this time, reversible shrinkage behavior of the first region 341 of the plasmon generator 34 is stopped. Therefore, shifting to irreversible shrinkage behavior of the plasmon generator 34 is avoided.

7. EFFECT

In the magnetic read write head 10 of the present embodiment, as described above, the continuous supply time Tm1 of the operation current IH to oscillate the laser light 45 by the laser diode 60 is set to 10 minutes or more and 2 hours or less. Therefore, the plasmon generator 34 is not exposed to high temperature over a long period of time. Further, the interruption time Tm2 is provided immediately after the continuous supply time Tm1, to interrupt the generation of the near-field light NF. As a result, the plasmon generator 34 is appropriately cooled, the excessive temperature increase of the plasmon generator 34 is avoided, and thus plastic deformation (reversible shrinkage behavior) is prevented. Accordingly, in the magnetic disk unit, degradation of the magnetic recording performance caused by deformation of the plasmon generator 34 is suppressed, and thus magnetic recording with higher density becomes possible. Moreover, improvement in product lifetime is allowed to be expected.

Moreover, the annealing treatment to the plasmon generator 34 is performed in the phase before the write operation, which certainly prevents the drastic shrinkage behavior of the first region 341 at the time of the write operation.

Furthermore, in the magnetic disk unit, the magnetic read write head 10 has the waveguide 32, the laser light 45 enters the waveguide 32 to generate the near-field light NF from the plasmon generator 34, and thus the magnetic disk 2 is heated. Therefore, as compared with the case where laser light or the like is directly applied to the plasmon generator 34 to heat the magnetic disk 2, the near-field light NF is allowed to be generated more efficiently, and the magnetic disk 2 is allowed to be heated efficiently.

8. EXAMPLES

Examples of the invention will be described in detail.

Experimental Examples 1-1 to 1-8

A relationship between the continuous supply time Tm1 and life time of the magnetic read write head 10 of the invention was examined. The results are illustrated in Table 1. Specifically, operation in which the operation current to the laser diode 60 was switched from IH to IL for each continuous supply time Tm1, and switched to IH again after four seconds was performed repeatedly. The lifetime used herein means a time point when SNR is decreased by 2 dB or more as compared with an initial value (SNR0). In addition, after normal write operation was performed by the operation current IH illustrated in Table 1, read operation of the written magnetic information was performed, and signal-to-noise ratio (SNR) of the read signal was measured. Note that the annealing treatment was not performed in the Experimental Examples 1-1 to 1-8.

TABLE 1

|  | Initial Characteristics | | Continuous Operation Test | |
|---|---|---|---|---|
|  | Operation Current IH [mA] | SNR0 [dB] | Tm1 [h] | Lifetime [h] |
| Experimental Example 1-1 | 25.5 | 13.1 | 0.17 | 265 |
| Experimental Example 1-2 | 22.5 | 14.1 | 0.17 | 410 |
| Experimental Example 1-3 | 18.6 | 11.9 | 0.5 | 175 |
| Experimental Example 1-4 | 24.0 | 14.7 | 0.5 | 220 |
| Experimental Example 1-5 | 21.8 | 13.5 | 2.0 | 310 |
| Experimental Example 1-6 | 24.1 | 14.1 | 2.0 | 185 |
| Experimental Example 1-7 | 22.9 | 11.4 | 3.0 | 35 |
| Experimental Example 1-8 | 18.8 | 12.7 | 3.0 | 65 |

As illustrated in Table 1, it was confirmed that setting the continuous supply time Tm1 of the operation current IH to 10 minutes or more and 2 hours or less sufficiently extends the lifetime of the magnetic read write head 10.

Experimental Examples 1-9 to 1-16

Next, the annealing treatment was performed before the normal write operation, and the relationship between the continuous supply time Tm1 and the lifetime was examined. In this case, the laser was oscillated from the laser diode 60 by an operation current that was 1.2 times of the operation current IH for the normal write operation, and the plasmon generator 34 was heated for 20 seconds. Moreover, after the normal write operation was performed by the operation current IH illustrated in Table 2, the read operation of the written magnetic information was performed, and the signal-to-noise ratio (SNR) of the read signal before and after the annealing treatment was measured. The results are illustrated in Table 2.

TABLE 2

|  | Initial Characteristics | | Characteristics after Annealing Treatment (20 seconds) | | | | Continuous Operation Test | |
|---|---|---|---|---|---|---|---|---|
|  | Operation Current IH [mA] | SNR0 [dB] | Operation Current IH [mA] | | SNR1 [dB] | SNR1/SNR0 [%] | Tm1 [h] | Lifetime [h] |
|  |  |  | Annealing | Write Operation |  |  |  |  |
| Experimental Example 1-9 | 24.6 | 12.3 | 29.5 | 24.6 | 13.8 | 112 | 0.17 | 545 |
| Experimental Example 1-10 | 28.5 | 14.2 | 34.2 | 28.5 | 14.8 | 104 | 0.17 | 1000 |
| Experimental Example 1-11 | 19.5 | 11.9 | 23.4 | 19.5 | 13.5 | 113 | 0.5 | 480 |
| Experimental Example 1-12 | 19.1 | 12.6 | 23.0 | 19.1 | 12.9 | 103 | 0.5 | 1000 |
| Experimental Example 1-13 | 21.0 | 13.2 | 25.2 | 21.0 | 12.9 | 98 | 2.0 | 1000 |
| Experimental Example 1-14 | 23.4 | 11.2 | 28.0 | 23.4 | 12.7 | 113 | 2.0 | 375 |
| Experimental Example 1-15 | 25.9 | 13.3 | 31.1 | 25.9 | 15.4 | 116 | 3.0 | 180 |
| Experimental Example 1-16 | 22.5 | 12.4 | 27.0 | 22.5 | 12.8 | 103 | 3.0 | 250 |

As illustrated in Table 2, also in the Experimental Examples 1-9 to 1-16, it was confirmed that setting the continuous supply time Tm1 of the operation current IH to 10 minutes or more and 2 hours or less sufficiently extends the lifetime of the magnetic read write head 10. Note that the SNR1 after the annealing treatment was improved as compared with SNR0 in an initial stage in many cases.

Experimental Examples 1-17 to 1-24

A relationship between the continuous supply time and the lifetime similarly to that in the Examples 1-9 to 1-16 except that the annealing treatment was performed for 60 seconds was examined, and the signal-to-noise ratio (SNR) of the read signal before and after the annealing treatment was measured. The results are illustrated in Table 3. Note that the results after the annealing treatment for 20 seconds are also illustrated in Table 3.

TABLE 3

|  | Initial Characteristics | | Characteristics after Annealing Treatment (20 seconds) | | | | Characteristics after Annealing Treatment (60 seconds) | | | | Continuous Operation Test | |
|---|---|---|---|---|---|---|---|---|---|---|---|---|
|  | Operation | | Operation Current IH [mA] | | | | Operation Current IH [mA] | | | | | Life- |
|  | Current IH [mA] | SNR0 [dB] | Annealing | Write Operation | SNR1 [dB] | SNR1/SNR0 [%] | Annealing | Write Operation | SNR2 [dB] | SNR2/SNR0 [%] | Tm1 [h] | time [h] |
| Experimental Example 1-17 | 24.3 | 14.0 | 29.2 | 24.3 | 15.5 | 111 | 29.2 | 24.3 | 13.8 | 99 | 0.17 | 1000 |
| Experimental Example 1-18 | 23.1 | 13.7 | 27.7 | 23.1 | 13.9 | 102 | 27.7 | 23.1 | 13.5 | 99 | 0.17 | 1000 |
| Experimental Example 1-19 | 20.1 | 12.7 | 24.1 | 20.1 | 14.2 | 112 | 24.1 | 20.1 | 12.9 | 102 | 0.5 | 1000 |
| Experimental Example 1-20 | 24.2 | 10.8 | 29.0 | 24.2 | 11.7 | 109 | 29.0 | 24.2 | 11.2 | 104 | 0.5 | 1000 |
| Experimental Example 1-21 | 25.0 | 11.0 | 30.1 | 25.0 | 12.8 | 116 | 30.1 | 25.0 | 11.4 | 103 | 2.0 | 1000 |
| Experimental Example 1-22 | 18.9 | 13.9 | 22.7 | 18.9 | 13.7 | 98 | 22.7 | 18.9 | 13.5 | 97 | 2.0 | 1000 |
| Experimental Example 1-23 | 25.3 | 12.6 | 30.4 | 25.3 | 13.4 | 106 | 30.4 | 25.3 | 12.8 | 102 | 3.0 | 630 |
| Experimental Example 1-24 | 22.7 | 11.9 | 27.2 | 22.7 | 12.9 | 108 | 27.2 | 22.7 | 11.7 | 98 | 3.0 | 425 |

As illustrated in Table 3, also in the Experimental Examples 1-17 to 1-24, it was confirmed that setting the continuous supply time Tm1 of the operation current IH to 10 minutes or more and 2 hours or less sufficiently extends the lifetime of the magnetic read write head 10. Moreover, the SNR2 after the annealing treatment for 60 seconds was substantially equal to the SNR0 in the initial stage.

Experimental Examples 2-1 to 2-8

The relationship between the continuous supply time Tm1 and the lifetime similar to that in the Examples 1-17 to 1-24 except that laser is oscillated from the laser diode 60 by an operation current 1.05 times of the operation current IH for the normal write operation to heat the plasmon generator 34 in the annealing treatment was examined, and the signal-to-noise ratio (SNR) of the read signal before and after the annealing treatment was measured. The results are illustrated in Table 4.

TABLE 4

|  | Initial Characteristics | | Characteristics after Annealing Treatment (20 seconds) | | | | Characteristics after Annealing Treatment (60 seconds) | | | | Continuous Operation Test | |
|---|---|---|---|---|---|---|---|---|---|---|---|---|
|  | Operation | | Operation Current IH [mA] | | | | Operation Current IH [mA] | | | | | Life- |
|  | Current IH [mA] | SNR0 [dB] | Annealing | Write Operation | SNR1 [dB] | SNR1/SNR0 [%] | Annealing | Write Operation | SNR2 [dB] | SNR2/SNR0 [%] | Tm1 [h] | time [h] |
| Experimental Example 2-1 | 22.1 | 12.7 | 23.2 | 22.1 | 13.0 | 102 | 23.2 | 22.1 | 13.2 | 104 | 0.17 | 1000 |

TABLE 4-continued

| | Initial Characteristics | | Characteristics after Annealing Treatment (20 seconds) | | | | Characteristics after Annealing Treatment (60 seconds) | | | | Continuous Operation Test | |
|---|---|---|---|---|---|---|---|---|---|---|---|---|
| | | | | Operation Current IH [mA] | | | | Operation Current IH [mA] | | | | | Life- |
| | Operation Current IH [mA] | SNR0 [dB] | Annealing | Write Operation | SNR1 [dB] | SNR1/SNR0 [%] | Annealing | Write Operation | SNR2 [dB] | SNR2/SNR0 [%] | Tm1 [h] | time [h] |
| Experimental Example 2-2 | 19.5 | 11.4 | 20.5 | 19.5 | 12.2 | 107 | 20.5 | 19.5 | 11.7 | 103 | 0.17 | 1000 |
| Experimental Example 2-3 | 20.5 | 13.2 | 21.5 | 20.5 | 13.6 | 103 | 21.5 | 20.5 | 13.8 | 105 | 0.5 | 1000 |
| Experimental Example 2-4 | 26.2 | 12.3 | 27.5 | 26.2 | 12.9 | 105 | 27.5 | 26.2 | 13.6 | 111 | 0.5 | 560 |
| Experimental Example 2-5 | 22.7 | 13.7 | 23.8 | 22.7 | 14.2 | 104 | 23.8 | 22.7 | 13.7 | 100 | 2.0 | 1000 |
| Experimental Example 2-6 | 21.4 | 11.5 | 22.5 | 21.4 | 12.5 | 109 | 22.5 | 21.4 | 11.9 | 103 | 2.0 | 670 |
| Experimental Example 2-7 | 20.8 | 10.9 | 21.8 | 20.8 | 11.8 | 108 | 21.8 | 20.8 | 11.7 | 107 | 3.0 | 180 |
| Experimental Example 2-8 | 25.2 | 13.3 | 26.5 | 25.2 | 13.6 | 102 | 26.5 | 25.2 | 13.4 | 101 | 3.0 | 375 |

As illustrated in Table 4, also in the Experimental Examples 2-1 to 2-8, it was confirmed that setting the continuous supply time Tm1 of the operation current IH to 10 minutes or more and 2 hours or less sufficiently extends the lifetime of the magnetic read write head 10.

Hereinbefore, although the invention has been described with reference to the embodiment, the invention is not limited to the above-described embodiment, and various modifications may be made. For example, in the thermally-assisted magnetic recording head of the invention, the configurations (the shapes, the positional relationship, etc.) of the waveguide, the plasmon generator, the magnetic pole, and the like are not limited to those described in the above-described embodiment, and a thermally-assisted magnetic recording head having other configuration may be employed. For example, in the above-described embodiment, the laser light 45 is introduced to the waveguide 32 to generate the evanescent light 46, and the surface plasmons 47 are excited on the surface of the plasmon generator 34 to generate the near-field light NF. However, the invention may adopt a configuration in which the laser light is directly applied to the plasmon generator 34 to generate the near-field light NF.

Moreover, the switching operation between the supply of the operation current IH and the supply of the operation current IL to the laser diode 60 is not limited to the operation following the timing diagram illustrated in FIG. 10.

Furthermore, in the above-described embodiment, the case where the annealing treatment to the plasmon generator is previously performed before the thermally-assisted magnetic recording to the magnetic disk has been described; however, the invention is not limited thereto. Even in the case where the annealing treatment is not performed previously, setting the continuous supply time of the operation current to oscillate the laser light by the laser diode to a predetermined time sufficiently extends the lifetime of the magnetic read write head.

The correspondence relationships between the reference numerals and the components of the present embodiment are collectively illustrated as follows.

1 . . . housing, 2 . . . magnetic disk, 3 . . . head arm assembly (HAA), 4 . . . head gimbal assembly (HGA), 4A . . . magnetic head device, 4B . . . suspension, 5 . . . arm, 6 . . . driver, 7 . . . fixed shaft, 8 . . . bearing, 9 . . . spindle motor, 10 . . . magnetic read write head, 11 . . . slider, 11A . . . element forming surface, 11B . . . back surface, 11S . . . air bearing surface (ABS), 12 . . . element forming layer, 13 . . . insulating layer, 14 . . . read head section, 16 . . . write head section, 17 . . . protective layer, 21 . . . lower shield layer, 22 . . . MR element, 23 . . . upper shield layer, 24, 27, 38, 39, 42 . . . insulating layer, 25 . . . non-magnetic layer, 26 . . . intermediate shield layer, 28 . . . lower yoke layer, 29 . . . leading shield, 30, 36, 37 . . . connecting layer, 31, 33 . . . cladding layer, 32 . . . waveguide, 34 . . . plasmon generator, 341 to 344 . . . first to fourth regions, 34G . . . tip section, 34S1 . . . surface plasmon exciting surface, 35 . . . magnetic pole, 351 . . . first layer, 352 . . . second layer, 41 . . . coil, 43 . . . upper yoke layer, 45 . . . laser light, 46 . . . evanescent light, 47 . . . surface plasmon, 50 . . . light source unit, 60 . . . laser diode, 100 . . . LSI, 101 . . . ROM, 111 . . . write gate, 121 . . . constant current circuit, 122 . . . amplifier, 123 . . . demodulation circuit, 131 . . . laser control circuit, 132 . . . temperature detector, GP . . . gap layer, NF . . . near-field light.

What is claimed is:
1. A thermally-assisted magnetic recording method to perform information recording to a magnetic recording medium by a thermally-assisted magnetic recording head having a magnetic pole and a heating element, the method comprising:
  performing annealing treatment of the heating element through applying first energy to the heating element and heating the heating element; and
  performing information recording to a predetermined recording region of the magnetic recording medium after the annealing treatment, the information recording being performed through;
    rotating the magnetic recording medium as well as floating the thermally-assisted magnetic recording head above the magnetic recording medium; and
    applying second energy to the heating element to heat a predetermined recording region of the magnetic recording medium as well as applying a write magnetic field from the magnetic pole to the predetermined recording region,
  wherein the first energy is 1.05 to 1.20 times the second energy.

2. The thermally-assisted magnetic recording method according to claim 1, wherein a time during which the second energy is continuously applied to the heating element is 10 minutes to 2 hours.

* * * * *